(12) United States Patent
Feldstein

(10) Patent No.: US 7,552,914 B1
(45) Date of Patent: Jun. 30, 2009

(54) HIGH PRESSURE HUMIDIFIER

(75) Inventor: George Feldstein, Cresskill, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 12/080,628

(22) Filed: Apr. 4, 2008

(51) Int. Cl.
*B01F 3/04* (2006.01)

(52) U.S. Cl. .......................... 261/4; 126/113; 261/115; 261/116; 261/129; 261/DIG. 15; 261/DIG. 78

(58) Field of Classification Search .......... 261/3–5, 261/115–118, 129–131, DIG. 15, DIG. 78; 126/113
See application file for complete search history.

(56) References Cited

U.S. PATENT DOCUMENTS

| | | | | |
|---|---|---|---|---|
| 1,801,565 | A | * | 4/1931 | Norton ................... 261/30 |
| 2,217,130 | A | * | 10/1940 | Niehart ................... 96/275 |
| 2,504,278 | A | * | 4/1950 | Read et al. .............. 236/44 A |
| 3,102,531 | A | * | 9/1963 | Gross ..................... 126/113 |
| 3,250,266 | A | * | 5/1966 | Auringer ................. 126/113 |
| 3,334,877 | A | * | 8/1967 | Payne ..................... 261/71 |
| 3,515,348 | A | * | 6/1970 | Coffman, Jr. ............ 239/103 |
| 3,570,742 | A | | 3/1971 | Santangelo |
| 3,689,037 | A | | 9/1972 | Payne |
| 3,770,254 | A | * | 11/1973 | Morrow ................... 261/105 |
| 3,791,633 | A | * | 2/1974 | Lowe ..................... 261/101 |
| 3,855,371 | A | * | 12/1974 | Morrow et al. ........... 261/100 |
| 3,898,976 | A | * | 8/1975 | Coffman, Jr. ............ 126/113 |
| 4,211,735 | A | * | 7/1980 | Berlin .................... 261/116 |
| 4,354,985 | A | * | 10/1982 | Johnson .................. 261/100 |
| 4,913,856 | A | | 4/1990 | Morton |
| 5,037,585 | A | * | 8/1991 | Alix et al. ............... 261/142 |
| 5,075,047 | A | | 12/1991 | Youngeberg |
| 5,277,849 | A | | 1/1994 | Morton |
| 5,407,604 | A | | 4/1995 | Luffman |
| 5,450,893 | A | | 9/1995 | Galba |
| 5,525,268 | A | * | 6/1996 | Reens .................... 261/78.2 |
| 6,092,794 | A | * | 7/2000 | Reens .................... 261/115 |
| 6,129,285 | A | | 10/2000 | Schafka |
| 6,398,196 | B1 | | 6/2002 | Light |
| 2005/0212152 | A1 | * | 9/2005 | Reens ..................... 261/81 |

FOREIGN PATENT DOCUMENTS

JP 55-121334 A * 9/1980 ............. 261/116

OTHER PUBLICATIONS

"Installation Manual, Humid-A-Mist™ Model HUM-100"; (date unknown); Galmar Enterprises, Inc., New Lenox, IL 60451.
"Armstrong Cool-Fog Systems" product brochure; (date unknown); Armstrong Humidification Group, Three Rivers, MI 49093.
"Humifog High Pressure Atomizing Humidifier" product brochure (date unknown); Carel USA, Manheim, PA 17547.

* cited by examiner

*Primary Examiner*—Richard L Chiesa
(74) *Attorney, Agent, or Firm*—Philip L. Kirkpatrick

(57) ABSTRACT

A high pressure water injection humidifier includes a filtration system (11) to filter an incoming water supply and provide filtered water (6) to a low volume high pressure pump (12) driven by a constant speed motor (13), which in turn provides pressurized water (7) to a plurality of exit nozzles (17), each exit nozzle having a precision orifice that atomizes the pressurized water into a mist, where the volume rate of the mist is dependent only on the motor speed and the diameter of the precision orifice.

21 Claims, 3 Drawing Sheets

HIGH PRESSURE HUMIDIFIER

BACKGROUND OF THE INVENTION

1. Technical Field

Figure 1:
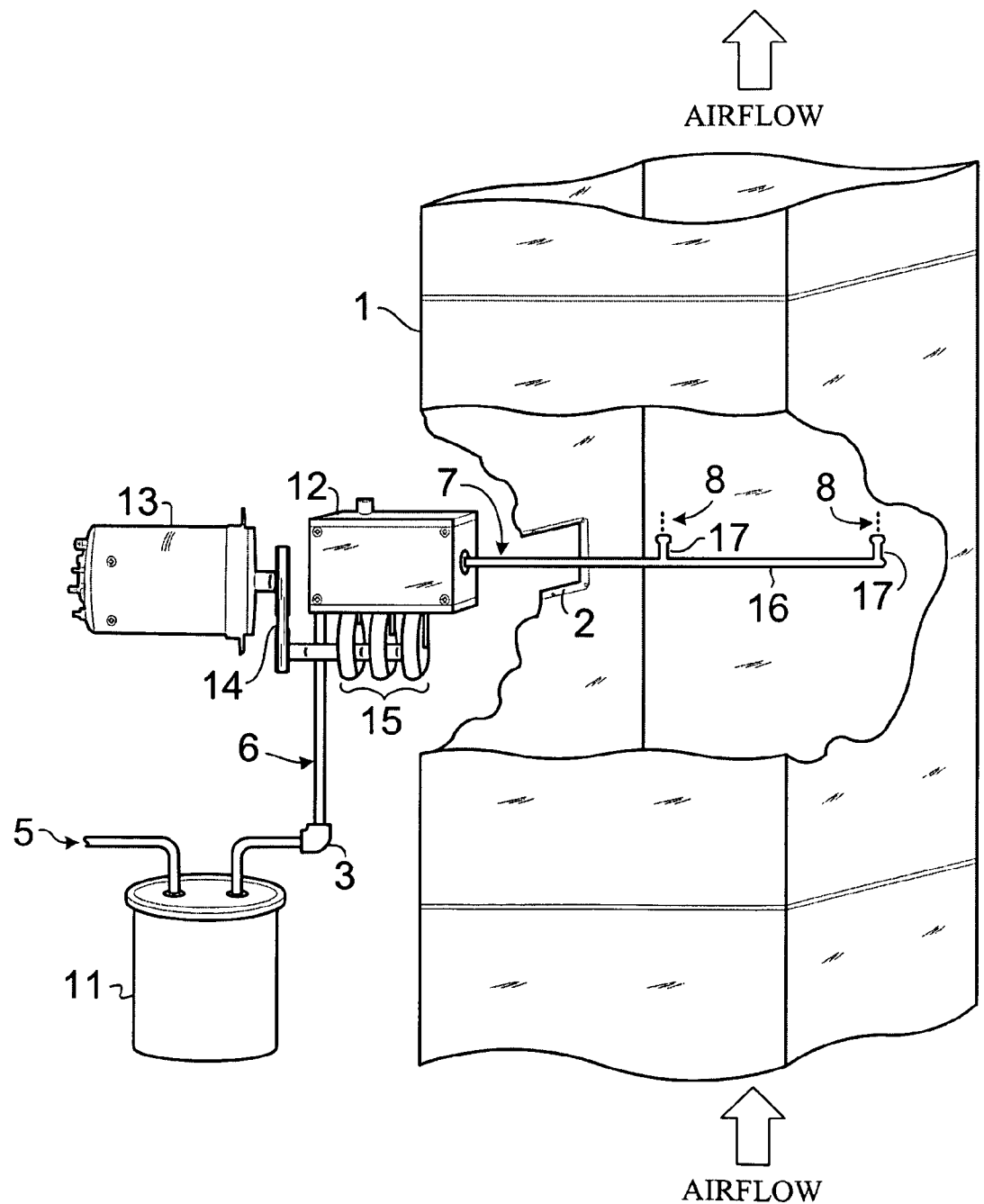

The present invention relates to climate control humidifiers and more specifically to a high pressure water injection humidifier having a constant speed motor and a precision orifice.

2. Background Art

It is well known that low ambient humidity in a building space leads to occupant discomfort, possible health problems, and electricity discharges. Such low ambient humidity also causes damage to furniture, papers, artwork, and musical instruments contained within the building. To obviate these problems, it is common practice to employ devices for adding moisture to the air. In this regard, a wide variety of humidification devices are commonly employed.

For example, evaporative type systems have been installed in the furnace plenum or heating ducts so that heated air is forced to flow through and about sponge-like members that are maintained in a moist condition by placing them in contact with a water reservoir. Such reservoirs must be maintained at a preset level to ensure sufficient moisture content in the sponge-like members. It is also known to utilize a steam generator in combination with a forced air heating system to place water vapor into the heated air stream. The steam is generated by use of a submerged heating element in a water reservoir tank. In each of these systems, the reservoir water level must be maintained at a predetermined level.

One of the specific problems associated with these water reservoir systems is that they provide a tank of standing water that can be a breeding ground for bacteria, molds, and other unhealthy agents.

In response to this problem, steam injection humidifiers have been developed. These systems connect to a continuous pressurized source of water such as a municipal water hookup, convert that water into steam, and spray that steam through a nozzle directly into the heated air system. However, these steam injection systems present other problems such as the corrosive nature of steam, especially when operating from a non-filtered water supply, the amount of energy required to convert water to steam quickly enough to provide a continuous supply of steam, and the danger of steam leaks.

In the associated field of residential air cooling systems (e.g. air conditioning); an adiabatic evaporative cooling process is used in which water is sprayed into the air without adding or extracting heat. Those knowledgeable in the field will recognize that when an unsaturated airflow is passed through a water spray, water will be evaporated and pass into the airflow as water vapor as long as the saturation point, for a given ambient temperature, is not reached. The heat required for such evaporation, latent heat of evaporation, comes only from the air. Accordingly, ambient air temperature is reduced and moisture content is increased without increasing the heat content of the air; also known as a constant enthalpy process.

Water injection humidification has been attempted, such as for example by a "Humid-A-Mist™" system manufactured by Galmar Enterprises Inc., of New Lenox, Ill. However such a system injects water at a typical residential water supply pressure of between 50 and 100 pound per square inch (psi) which disadvantageously results in relatively large water droplet sizes.

There is a non-associated field of water-jet cutting in which is known a method of cutting materials using a jet of water. Such cutting can be done for soft or low density materials, such as foam, using water only, or for hard dense materials, such as tool steel, by adding an abrasive to the water-jet. The water is forced through a precision orifice to create a well defined stream of water, typically produced under pressures of 40,000 to 60,000 PSI (pounds per square inch). The pump high-rate water flows and extreme high water pressures associated with water-jet cutting are not desirable for residential humidification.

To solve the aforementioned problems associated with the existing state of the art in residential humidification systems, the present invention injects atomized water directly into an operational airflow, such as a heated airflow from a forced air heating system or alternatively an unheated airflow from a stand-alone fan. I have discovered that using a relatively high water pressure, such as 1000 psi, in conjunction with a low-rate water flow, such as 1 gallon per hour, and a precision orifice gives unexpected and desirable results that are directly applicable to residential humidification. Advantageously, preferred embodiments of the present invention incorporate several features to protect against water leakage, indicate system faults, provide water flow indication, and establish humidification profiles based on outside air temperature.

SUMMARY OF THE INVENTION

The following summary of the invention is provided to facilitate an understanding of some of the innovative features unique to the present invention. A full appreciation of the various aspects of the invention can only be gained by taking the entire specification, claims, drawings, and abstract as a whole.

According to a first aspect, the present invention provides a humidifier configured for use within the plenum of an existing heating system which uses an operational airflow. The humidifier comprises a humidity sensor, a duty-cycle signal, a filtration system, a low volume high pressure pump, a constant speed motor, a wand pipe, and a plurality of exit nozzles. The humidity sensor measures the humidity of air entering the heating system and provides a humidity value signal. The duty-cycle signal is computed from the humidity value signal and a predetermined control profile. The filtration system filters suspended particles from an incoming water supply and provides filtered water to the low volume high pressure pump which accepts this filtered water and provides pressurized water at a constant high pressure. The constant speed motor is mechanically connected to the pump and drives the pump in response to the duty-cycle signal. The wand pipe extends into the plenum and accepts the pressurized water. The wand pipe further comprises a plurality of exit nozzles where each nozzle includes a precision orifice that atomizes the pressurized water into a mist and injects that mist into the operational airflow. The diameter of each precision orifice is sized in conjunction with the constant speed of the motor to provide a precise constant volume flow of atomized water.

According to a second aspect, the present invention provides a humidifier comprising a constant speed motor, a filtration system, a low volume high pressure pump, and a plurality of exit nozzles. The constant speed motor operates in response to a duty-cycle signal. The filtration system provides filtered water. The low volume high pressure pump is mechanically connected to the constant speed motor and pressurizes the filtered water. The exit nozzles each include a precision orifice that atomizes the pressurized filtered water into a mist. The diameter of each precision orifice is sized in conjunction with the constant speed of the motor.

According to a third aspect, the present invention provides a humidification system that comprises an outside air temperature sensor, a humidity sensor, control electronics, a constant speed motor, a fan, a water filter, a low volume high pressure pump, a plurality of exit nozzles, and a plurality of acoustical nozzle flow detectors. The outside air temperature sensor provides an OAT value signal. The humidity sensor measures the humidity of ambient air and provides a humidity value signal. The control electronics accept the OAT value signal and the humidity value signal and compute a duty-cycle signal therefrom. The constant speed motor operates in response to the duty-cycle signal. The fan accepts the ambient air and provides an operational airflow. The water filter accepts an incoming water supply and provides filtered water. The low volume high pressure pump is mechanically connected to the constant speed motor and pressurizes the filtered water. Each exit nozzle includes a precision orifice adapted to atomize the pressurized filtered water into a mist. The diameter of each precision orifice is sized in conjunction with the constant speed of the motor. Each acoustical nozzle flow detector is mounted adjacent to an exit nozzle. The control electronics determine whether each of the nozzles is injecting water into the operational airflow by comparing the white noise output of each acoustical detector against an ambient white noise level including energy content at 50 kHz.

The present invention seeks to overcome or at least ameliorate one or more of several problems, including but not limited to: providing a humidifier hat does not require a standing water reservoir or the use of steam.

Unless the context clearly requires otherwise, throughout the description and the claims, the words ‘comprise’, ‘comprising’, and the like are to be construed in an inclusive sense as opposed to an exclusive or exhaustive sense; that is to say, in the sense of “including, but not limited to”.

BRIEF DESCRIPTION OF DRAWINGS

The accompanying figures further illustrate the present invention.

BRIEF DESCRIPTION OF THE SEVERAL VIEWS OF THE DRAWING

FIG. 1 depicts an isometric view of the major components of the inventive humidifier as installed in an illustrative hot air heating system.

FIG. 2 depicts additional components of the inventive humidifier as shown in FIG. 1.

FIG. 3 shows a control panel suitable for use with the inventive humidifier according to one illustrative embodiment of the present invention.

LIST OF REFERENCE NUMBERS FOR THE MAJOR ELEMENTS IN THE DRAWING

The following is a list of the major elements in the drawings in numerical order.

1 plenum (existing heating system)
2 rectangular opening (in plenum 1)
3 leak detector
5 tap water
6 filtered water (from filtration system 11)
7 pressurized water (from low volume high pressure pump 12)
8 atomized water (from nozzle 17)
11 filtration system
12 low volume high pressure pump
13 constant speed motor (drives low volume high pressure pump 12)
14 drive belt
15 cam system
16 wand pipe
17 nozzle
21 pressure sensor (pump supply side)
22 pump pressure relief
23 water shut-off valve
24 humidity sensor
25 control electronics
26 drip tray
27 drip sensor (within drip tray 26)
28 nozzle flow detector
29 airflow temperature sensor
30 control panel
251 humidistat
252 outside air temperature

DETAILED DESCRIPTION OF THE INVENTION

The present invention is an improved humidification system applicable to residential housing.

MODE(S) FOR CARRYING OUT THE INVENTION

Refer first to FIG. 1 which shows the major components of my inventive high pressure humidifier system as it might typically be installed into an existing residential forced hot air heating system. Existing heating plenum 1 is shown in a cut-way view. A rectangular opening 2 is cut into plenum 1 when the humidifier is installed, in a well known manner.

During normal operation, tap water 5 enters filtration system 11 and exits as filtered water 6. In one embodiment, filtration system 11 includes a particle to remove suspended particles greater in size than approximately 2 microns, an activated charcoal filter to remove organics and chlorine, and a de-ionizing filter to remove barium calcium, magnesium, potassium, silicon, and sodium. In a further embodiment, a water quality monitor verifies the performance of the de-ionizing filter.

Any leaks in the filtered water 6 line are detected by leak sensor 3. In one illustrative embodiment, tap water 5 at a pressure of between 50 and 100 pounds per square inch (psi) is connected through a ¼" inner diameter (ID) tube to a sediment filter, which removes the largest particles from the tap water 5. After the sediment filter, the water is then routed through carbon filters that remove chemicals such as chlorine. After the carbon filters, the water is routed through a reverse osmosis membrane filter leaving any remaining suspended particles caught in the membrane. The filtered water 6 then exits the filtration system 11 via ¼" ID tubing. Advantageously, the present inventive humidification system is constantly filtering the water being used in a closed system, such filtered water 6 is not allowed to stagnate and will be mold and bacteria free. In certain embodiments, the filtered water 6 is further sterilized by an ultraviolet (UV) sterilizer, not shown The filtered water 6 exits the filtration system 11 and enters low volume high pressure pump 12 which is mechanically driven by constant speed motor 13 via a transmission having a drive ratio, such as drive belt 14 and cam system 15. The low volume high pressure pump 12 increases water pressure from standard pressure, such as 50 to 100 psi up to an operating high pressure, such as 1000 psi. After such pressurization, pressurized water 7 exits the low volume high pressure pump 12.

In one illustrative embodiment, the constant speed motor 13 is an AC induction motor, selected for durability, efficiency, and an ability to provide sufficient starting torque at a high rotational speed. In this embodiment, the cam system 15 comprises three cams, offset 120 degrees from each other, mounted to a shaft using needle bearings. The shaft has ball bearings on each end, which attach to two end plates using C-class clips. A first pulley, mounted on this shaft, is operably connected to drive belt 14 which is in turn operably connected to a second pulley mounted on the shaft of constant speed motor 13. A computer such as a microprocessor, not illustrated, monitors the pump 12 input water pressure, output water pressure, and drive shaft torque and therefrom computes and controls the duty-cycle of constant speed motor 13, such as 5 minutes on, 3 minutes off, etc. The pump 12 further comprises a manifold and a top plate. The pump manifold has a ¼" ID inlet tube and a ⅛" ID outlet tube and internally includes three working pistons, driven by cam system 15, check valves associated with each piston, and a high-pressure monitor. The check valves consist of springs and ring seals and are mounted to the manifold by plugs located on the sides thereof.

In a preferred embodiment, the cam system 15 is combined with the low volume high pressure pump 12 into an integral assembly.

Pressurized water 7 exits the low volume high pressure pump 12 and enters the heating plenum 1 via wand pipe 16. The pressurized water must be sufficiently filtered to eliminate particles that would be large enough to clog a very small diameter orifice, such as 0.004" diameter.

Atomized water 8 exits nozzles 17 through precision orifices and is thereby introduced into the operational airflow of the forced hot air heating system. As previously noted, in other embodiments of the present invention, such as a stand-alone humidification system, the atomized water is introduced into an unheated airflow of a stand-alone fan. Each nozzle 17 contains a small precision orifice, such as 0.004" diameter, so that a very fine mist is produced. The nozzle 17 is preferably made of a material such as stainless steel, which is durable at high water pressures. The typical water flow rate at 1000 psi is a constant ½ gallon per hour, per nozzle, where this value is dependent on the diameter of the precision orifice and the speed of the motor 13.

Figure 2:
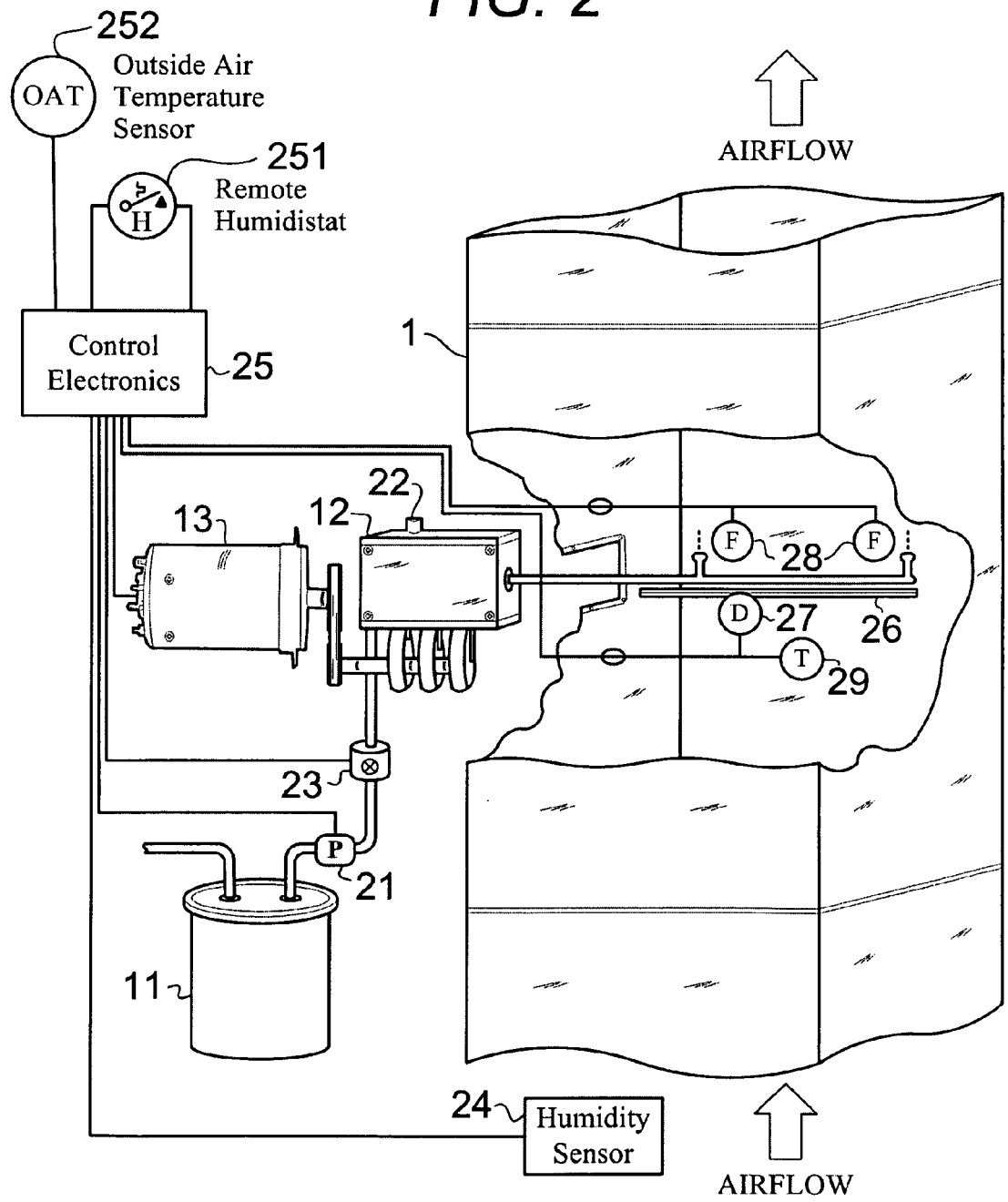

Refer now to FIG. 2 and continue to refer to FIG. 1. FIG. 2 illustrates additional components of a humidification system in accordance with several embodiments of the present invention. The overall operation of the inventive humidification system is controlled by control electronics 25 which includes processing, control logic, and electrical interfaces with the remaining system components. It will be apparent to those skilled in the art, that a microprocessor running appropriate software would be suitable for such a task.

A humidity sensor 24 detects the relative humidity of the air return from a heating zone, or in certain stand-alone humidifier embodiments, the relative humidity of the local air entering the system and produces a humidity value signal which is transmitted to control electronics 25. A remote mounted humidistat 251 in the heating zone, or in certain embodiments a locally mounted humidistat, issues a "humidity call" when the humidity is lower than desired. The humidity call is processed by the control electronics 25, which under the appropriate circumstances described below, provides a voltage to open water control valve 26, and operates constant speed motor 13. As described previously for FIG. 1, constant speed motor 13 drives pump 12 to pressurize the water from filtration system 11.

Control electronics 25 processes the humidity value signal from humidity sensor 24, the humidity call from humidistat 251, and the temperature signal from outside air temperature sensor 252, such as a thermistor. The control electronics 25 also monitors the pump filtered water 6 supply for suitable pressure, such as at least 40 psi, using pressure sensor 21, and leaks using leak detector 3. Low water output pressure from the filtration system 11 may occur when a filter is clogged.

A pump pressure relief valve 22 prevents the pressurized water 7 from reaching an undesirable pressure level, such as 1200 psi, which might happen if a precision orifice of one of the nozzles 17 becomes blocked. If this pressure relief valve 22 is tripped, the control electronics 25 will immediately shut valve 26 and turn off constant speed motor 13 to preclude possible pump or motor damage.

It is only desirable to inject the atomized water mist into the forced air heating system when the furnace (not shown) is operating to heat the air and a fan (also not shown) is blowing the heated air through heating plenum 1. Accordingly, heater temperature sensor 29 is placed in the operational airflow prior to the wand pipe 16. Airflow temperature sensor 29 is connected to control electronics 25 and provides an indication that the operational airflow is at a suitable temperature and flow rate to absorb the atomized water, such as a heating system being operational and where it is suitable to inject water.

Drip tray 26 is positioned beneath wand pipe 16 to preclude water dripping into the airflow source, such as a furnace fan. During operation, any water remaining in drip tray 27 should be evaporated by hot airflow during the next operational cycle. To preclude any water dripping, a drip sensor 27, mounted in drip tray 26, reports the presence of water to control electronics 25.

Actual injection of atomized water 8 at nozzles 17 is monitored by nozzle flow detectors 28. In a first embodiment of the present invention, such nozzle flow detectors 28 are temperature probes and water injection is inferred at control electronics 25 by a temperature drop between the temperature measured by heater temperature sensor 29 and the temperature measured downstream of nozzles 17.

In a second embodiment of the present invention, the flow detectors 28 are acoustical sensors, such as ceramic microphones. I have discovered that the flow of highly pressured water exiting a small precision orifice, of approximately 0.004 inch diameter, produces a noise signature characterized by an increase in ultrasonic white noise having substantial energy content at approximately 50 kHz. In this preferred embodiment, the electrical signal from each acoustical flow detector 28 is processed at control electronics 25 to detect such a signature by looking for a 5 decibel (dB) increase in such white noise level.

It will be recognized by those skilled in the art that components making up my invention may be packaged in various ways, for example the cam system 15 will likely be built as an integral part of the low volume high pressure pump 12. Similarly, the constant speed motor 13, drive belt 14, and pump 12 are packaged in an overall case (not shown) to protect them from the environment and also for ease of installation and maintenance.

I have discovered that for a low volume, such as ½ gallon per hour per exit nozzle, high pressure, such as 1000 psi, water pump 12 providing pressurized water 7 to a nozzle 17 including a very small diameter, such as 0.004 inch, precision orifice, that the output atomized flow is function dependent on motor speed and orifice diameter and independent of input pressure, as long as the required water volume is available. Accordingly, I have developed an apparatus and method for humidifying an airstream using a relatively low-cost constant speed motor which is duty-cycle controlled, such as: on for 5 minutes, off for 3 minutes, on for 5 minutes, etc. This duty cycle is based on the known constant volume of water, such as ½ gallon per hour per nozzle 17 and a computed humidification control profile based on outside air temperature, such as measured by outside air temperature (OAT) sensor 252, and local humidity, such as measured by humidity sensor 24. Advantageously, changing the motor 13 speed as input to the pump 12 directly changes the pump output pressure. Accordingly, a 2× pulley drive ratio at drive belt 14 is suitable for a two nozzle 17 system, a 3× pulley drive ratio at drive belt is suitable for a three nozzle system, etc. In one embodiment of my invention, the installer can select a set of pulleys based on the amount of humidification required, where the same pump 12 and constant speed motor 13 are used for multiple pulley-ratio nozzle combinations.

Figure 3:
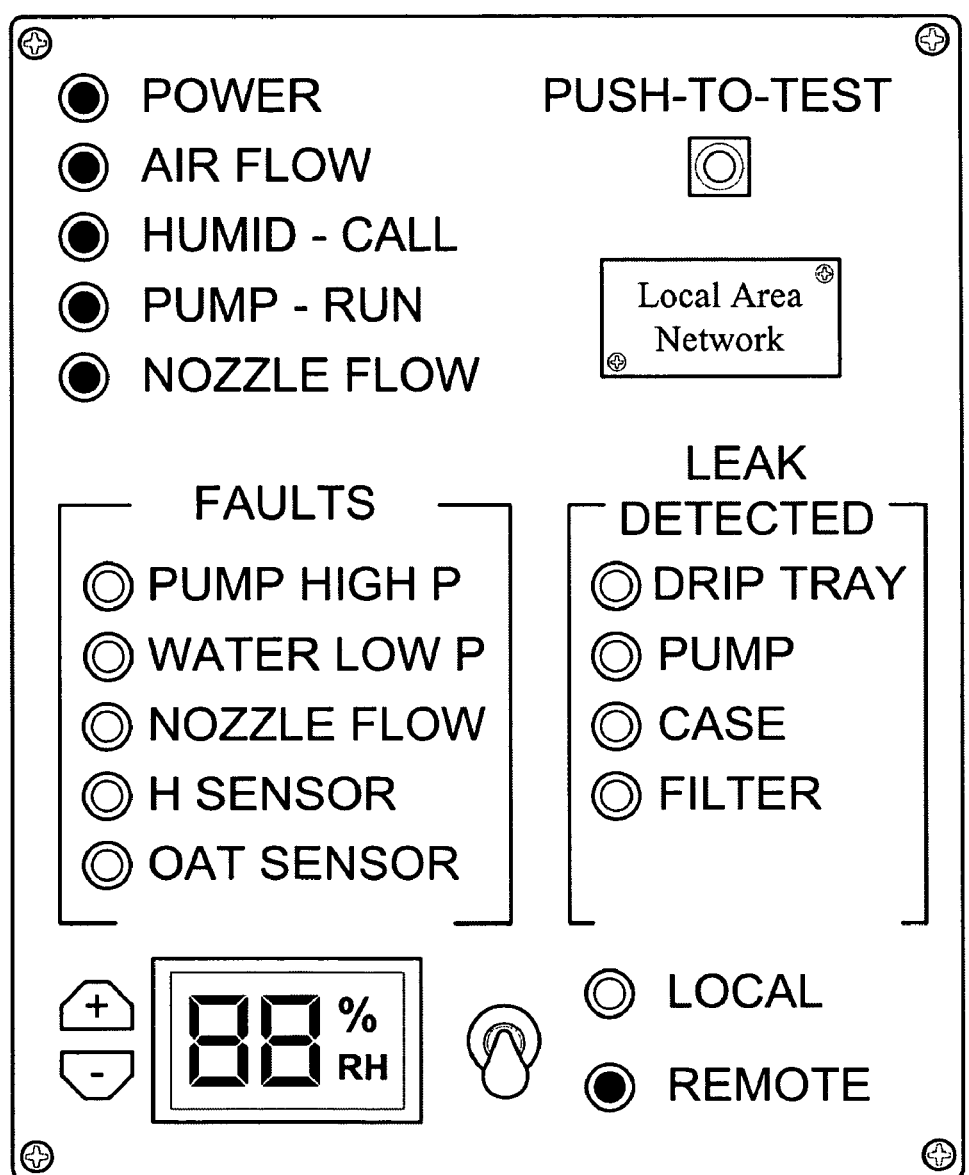

FIG. 3 shows a control panel 30 suitable for use with the inventive humidifier according to one illustrative embodiment of the present invention. Those skilled in the art will recognize that this is only one possible implementation of such a control panel and that the control panel 30 could be made integral with control electronics 25, installed as a separate unit, or even replaced with a virtual control panel on a computer display. This control panel shows that a humidity setting could be made locally, where for example a humidity sensor is installed in the heating system return duct. It also shows that various fault conditions can be displayed locally at a control panel 30 or that the control electronics 25 (shown in FIG. 2) could be connected to a local area network.

Control panel 30 is laid out in an intuitive manner for both ease of monitoring normal operation and performing maintenance. For example, normal operation is monitored by lights, such as light-emitting diodes (LED), shown in the upper left corner of the control panel 30. "Power" indicates that electrical power is being provided. "Airflow" indicates that sufficient airflow is crossing the nozzles 17 for proper system operation. For embodiments installed in a forced air heating existing plenum, a temperature probe mounted in the operational airflow upstream of the nozzles 17, such as airflow sensor 29 has proved suitable. "Humid Call" indicates that a remote mounted humidistat 251 is calling for humidification of air being provided to a particular heating zone. "Pump Run" is illuminated when the high pressure pump 13 is running.

"Nozzle Flow" (operate) is illuminated when flow detector 28 detects that atomized water is flowing flow nozzle 17. In a preferred embodiment, the control electronics 25 processes an acoustical signature as described above.

Depressing the "Push-to-Test" button will illuminate all of the lights and run the water pump during some part of a predetermined test sequence.

On the left side of control panel 30 and located approximately midway vertically is shown a section of fault lights. These fault lights indicate conditions that are causing, or will cause the inventive system to not operate properly. "Pump High P" indicates that the pressure relief 22 at pump 12 has been tripped, possibly because nozzle 17 flow has been impeded. "Water Low P" indicates that the pressure of filtered water 6 is less than a predetermined value, such as 40 psi, possibly due to a clogged filtration system 11, or a leak before the pump 12 inlet. "Nozzle Flow" (fault) indicates that nozzle flow detector 28 may not be functioning correctly. The "H Sensor" and "OAT Sensor" lights illuminate to indicate potential problems with the humidity sensor 24 and the outside air temperature sensors 252, respectively.

On the right side of control panel 30 and located approximately midway vertically is shown a section of 'leak detected' fault lights, which indicates that water leaks have been detected at the drip tray 26, pump 12, case (not shown), and the filtered water 6, respectively.

Finally, a 'local/remote' selection switch allows for the humidistat 251 to be either located locally, such as at the control panel, or at a remote heating zone location. Advantageously, the status of each of the lights, operation of built in test features, and selection of local humidity can be via a remote computer that is connected to the "Local Area network" connection.

LIST OF ACRONYMS USED IN THE DETAILED DESCRIPTION OF THE INVENTION

The following is a list of the acronyms used in the specification in alphabetical order.

D drip
dB decibel
DC direct current
F flow
H humidity
ID inner diameter
kHz kilohertz
LED light emitting diode
OAT outside air temperature
P pressure
psi pounds per square inch
T temperature
UV ultraviolet Alternate Embodiments Alternate embodiments may be devised without departing from the spirit or the scope of the invention. For example, a stand-alone humidifier or evaporative cycle air conditioner could use the unique low rate high pressure pump as combined with the precision orifice nozzle and the duty-cycle control as described herein. Or an improved heating, ventilation, and air conditioning (HVAC) system with the present invention included as an integral component thereof.

What is claimed is:

1. A humidifier configured for use within the plenum (1) of an existing heating system having an operational airflow therein, said humidifier comprising:
   (a) a humidity sensor (24) adapted to measure the humidity of air entering the heating system and to provide a humidity value signal;
   (b) a duty-cycle signal computed from the humidity value signal and a predetermined control profile;
   (c) a filtration system (11) adapted to filter suspended particles from an incoming water supply and to provide filtered water (6);
   (d) a low volume high pressure pump (12) adapted to accept the filtered water and to provide pressurized water (7) at a constant high pressure;
   (e) a constant speed motor (13) mechanically connected to the pump and adapted to drive said pump in response to the duty-cycle signal computed from the humidity sensor;
   (f) a wand pipe (16) extending into the plenum and adapted to accept the pressurized water, wherein said wand pipe further comprises
      (i) a plurality of exit nozzles (17), each including a precision orifice adapted to atomize said pressurized water into a mist and to inject said mist into the operational airflow; and (g) wherein the diameter of each precision orifice is sized in conjunction with the constant speed of the motor to provide a precise constant volume flow of atomized water.

2. The humidifier of claim 1 wherein the filtration system is adapted to accept tap water at a pressure of between 50 and 100 pounds per square inch and said filtration system further comprises:
(a) a particle filter adapted to remove suspended particles greater in size than approximately 2 microns;
(b) an activated charcoal filter adapted to remove organics and chlorine; and
(c) a de-ionizing filter adapted to remove barium calcium, magnesium, potassium, silicon, and sodium.

3. The humidifier of claim 2 wherein the filtration system further comprises:
(a) a water quality monitor adapted to monitor the performance of the de-ionizing filter.

4. The humidifier of claim 1 wherein the filtration system further comprises:
(a) an ultraviolet sterilizer adapted to sterilize the filtered water.

5. The humidifier of claim 1 further comprising:
(a) a cam system (15) mechanically interposed between the motor and the low volume high pressure pump wherein the cam system comprises:
  (i) a mechanical shaft, and
  (ii) three cams offset 120 degrees from each other, wherein said cams are mounted to the mechanical shaft using needle bearings.

6. The humidifier of claim 5 wherein the low volume high pressure pump further comprises:
(a) a manifold having side surfaces;
(b) three working pistons installed within the manifold, wherein each of said pistons is driven by a corresponding cam; and
(c) check valves associated with each piston, said check valves further comprising
  (i) springs, and
  (ii) ring seals, wherein
  (iii) the ring seals are mounted to the manifold by plugs located on the side surfaces thereof.

7. The humidifier of claim 6 wherein the cam system is combined with the low volume high pressure pump into an integral assembly.

8. The humidifier of claim 1 wherein:
(a) the high pressure pump provides pressurized water (7) at approximately 1000 pounds per square inch;
(b) the constant volume flow is approximately ½ gallon per hour per exit nozzle; and
(c) the speed of the constant speed motor and the diameter of the precision orifice are sized accordingly.

9. The humidifier of claim 8 wherein the precision orifice is approximately 0.004 inches diameter.

10. The humidifier of claim 1 further comprising:
(a) control electronics (25);
(b) an airflow temperature sensor (29) mounted in the operational airflow upstream of the nozzles, and measuring a upstream temperature;
(c) a plurality of nozzle flow detectors, each of said nozzle flow detectors mounted adjacent to a corresponding one of the plurality of exit nozzles.

11. The humidifier of claim 10 wherein:
(a) each of the nozzle flow detectors is a temperature probe mounted in the operational airflow downstream of the nozzles, and measuring a downstream temperature; and
(b) the control electronics is configured to determine whether each of the nozzles is injecting water into the operational airflow by comparing the upstream temperature to each of the corresponding downstream temperatures.

12. The humidifier of claim 10 wherein:
(a) each of the nozzle flow detectors is an acoustical sensor; and
(b) the control electronics is configured to determine whether each of the nozzles is injecting water into the operational airflow by comparing the output of the acoustical sensor against a predetermined acoustic signature.

13. The humidifier of claim 12 wherein:
(a) the predetermined acoustical signature is ultrasonic white noise at a level above ambient noise and with substantial energy content at 50 kHz.

14. The humidifier of claim 13 wherein:
(a) the level above ambient noise is 5 dB.

15. A humidifier comprising:
(a) a constant speed motor adapted to operate in response to a duty-cycle signal;
(b) a filtration system adapted to provide filtered water;
(c) a low volume high pressure pump mechanically connected to the constant speed motor and adapted to pressurize the filtered water;
(d) a plurality of exit nozzles, each including a precision orifice adapted to atomize said pressurized filtered water into a mist; and
(e) wherein the diameter of each precision orifice is sized in conjunction with the constant speed of the motor.

16. The humidifier of claim 15 wherein:
(a) the duty-cycle signal computed from a humidity value signal, an outside air temperature signal, and a predetermined humidity control profile.

17. The humidifier of claim 16 wherein:

(a) the duty-cycle signal is a repetitive signal comprising a 5 minute on period followed by a 3 minute off period.

18. The humidifier of claim 15 further comprising:

(a) a transmission having a drive ratio mechanically interposed between the motor and the pump; and wherein (b) the drive ratio is selected in conjunction with the number of nozzles contained within the plurality thereof.

19. The humidifier of claim 15 further comprising:

(a) a control panel which selectively allows use of a local humidistat or a remote humidistat;

(b) a plurality of drip sensors; and wherein (c) the control panel displays operational and diagnostic indications, including the status of the drip sensors.

20. The humidifier of claim 15 wherein the plurality of nozzles are fabricated from stainless steel.

21. A humidification system comprising:

(a) an outside air temperature sensor adapted to provide an OAT value signal;

(b) a humidity sensor adapted to measure the humidity of ambient air and to provide a humidity value signal;

(c) control electronics adapted to accept the OAT value signal and the humidity value signal and to compute a duty-cycle signal therefrom;

(d) a constant speed motor adapted to operate in response to the duty-cycle signal;

(e) a fan adapted to accept the ambient air and to provide an operational airflow;

(f) a water filter adapted to accept an incoming water supply and to provide filtered water;

(g) a low volume high pressure pump mechanically connected to the constant speed motor and adapted to pressurize the filtered water;

(h) a plurality of exit nozzles, each including a precision orifice adapted to atomize said pressurized filtered water into a mist, wherein the diameter of each precision orifice is sized in conjunction with the constant speed of the motor;

(i) a plurality of acoustical nozzle flow detectors, each mounted adjacent to a corresponding one of the plurality of exit nozzles; and (j) wherein the control electronics is further configured to determine whether each of the nozzles is injecting water into the operational airflow by comparing the white noise output of each acoustical sensor against an ambient white noise level including energy content at 50 kHz.

* * * * *